United States Patent [19]

Fogg et al.

[11] 3,904,576

[45] Sept. 9, 1975

[54] BLEND OF TWO CHLOROPRENE POLYMERS

[75] Inventors: Sidney George Fogg, Ashstead; David John Walker, Epsom, both of England

[73] Assignee: BP Chemicals International Limited, London, England

[22] Filed: May 14, 1974

[21] Appl. No.: 469,803

[30] Foreign Application Priority Data
May 17, 1973  United Kingdom............... 23532/73
July 26, 1973  United Kingdom............... 35615/73

[52] U.S. Cl... 260/33.8 UA; 260/455 B; 260/654 R; 260/890
[51] Int. Cl.² ...................... C08K 5/02; C08L 47/00
[58] Field of Search ........ 260/455 B, 33.8 UA, 890, 260/654 R

[56] References Cited
UNITED STATES PATENTS
2,321,693   6/1943   Meisenburg et al. ............... 260/92.3
2,567,117   9/1951   Mochel ............................. 260/92.3
3,042,652   7/1962   Pariser et al. ...................... 260/890
3,079,365   2/1963   Andersen et al. ............ 260/33.8 UA
3,147,317   9/1964   Jungk et al. ....................... 260/890
3,388,188   6/1968   Sturt ................................. 260/890

Primary Examiner—M. J. Welsh
Assistant Examiner—H. H. Fletcher
Attorney, Agent, or Firm—Brooks Haidt Haffner & Delahunty

[57] ABSTRACT

A chloroprene polymer blend comprises a major proportion of a first benzene-soluble polymer of defined Mooney Viscosity formed by polymerisation in the presence of a xanthogen modifier and a minor proportion of a fluid benzene-soluble chloroprene polymer made in the presence of a defined quantity of modifier.

12 Claims, 1 Drawing Figure

PROPORTION OF FLUID POLYMER IN BLEND

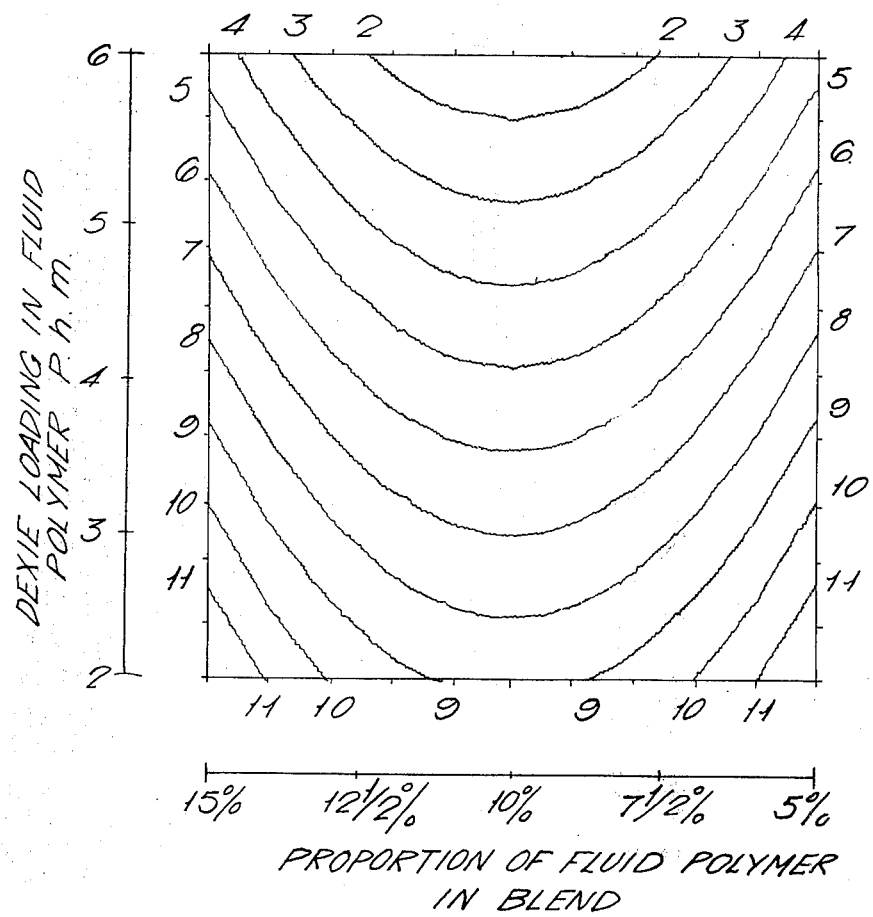

BLEND OF TWO CHLOROPRENE POLYMERS

The present invention relates to blends of chloroprene polymers. It particularly relates to such blends having a good combination of physical properties. It further relates to a process for the production of such blends.

Many chloroprene polymers, for example polymers made by polymerising chloroprene in the presence of a mercaptan modifier, do not completely retain the exact size and shape into which they are formed by rubber working machinery but tend to become distorted immediately after the forming operation. This characteristic is known as "nerve" or "elastic memory" and it interferes with the use of the polymers in certain operations such as high speed extrusion of complicated cross-sections. For example, extrudates tend to shrink longitudinally and increase in cross-sectional area on leaving the die. This is described as "die swell."

It is well-known that in order to obtain polychloroprenes which have improved "nerve" or "elastic memory" it is necessary to use a blend of the normal solid benzene-soluble polymer, the so-called "sol" polymer with a proportion of cross-linked benzene insoluble polymer, the so-called gel polymer. The use of such a composition is disclosed in, for example British patent specification No. 979,040, which also discloses the addition of fluid rubber to the sol/gel blend to improve the surface smoothness of extrudates prepared from the blend. This fluid rubber in contrast to the gel has a low molecular weight, and its use appears to correspond to the known use of oils and softeners to improve the surface smoothness of extrudates.

It has now surprisingly been found that the undesirable "nerve" and "elastic memory" properties such as die swell may be reduced by the addition to a sol rubber of a specified fluid, i.e. low molecular weight, polychloroprene in place of the known high molecular weight gel polymer.

Accordingly, the present invention provides a chloroprene polymer blend which comprises from 95 to 85% by weight of a first benzene-soluble chloroprene polymer having a Mooney Viscosity ML1+4' at 100°C in the range 40 to 100 and 5 to 15% by weight of a second, fluid, benzene-soluble chloroprene polymer formed by the polymerisation of chloroprene in the presence of a quantity of xanthogen modifier, as herein defined, equivalent to 2 to 7% by weight based on monomer of diethyl xanthogen disulphide to produce a fluid polymer. The present invention also provides an extruded article made from the chloroprene polymer blend of the present invention.

The Mooney viscosity ML1+4' (100°C) of a polymer is determined by the method described in British Standard Specification No. 1673, Part 3, 1951 when the rubber is passed ten times through a mill with the rolls at a temperature of 20±5°C and with a nip gap of eighty thousandths of an inch.

Both benzene-soluble chloroprene polymers may be prepared by polymerising chloroprene or copolymerising chloroprene with not more than 20% by weight based on the total weight of monomeric material of a copolymerisable monomer or monomers in an aqueous emulsion system to give a polymer having the desired properties. Examples of copolymerisable monomers are styrene, acrylonitrile and 2,3-dichloro-1,3-butadiene.

The first benzene soluble chloroprene polymer may be a single conventional polymer or a mixture of conventional polymers prepared by known techniques whereby chloroprene monomer is polymerised in aqueous emulsion in the presence of a modifier, such as a mercaptan, to give a benzene-soluble rubber having a Mooney Viscosity ML1+4' in the range 40 to 100 and preferably in the range 50 to 70.

The desired Mooney Viscosity is obtained by varying the quantity of modifier employed in conjunction with the degree of conversion of monomeric material to polymer. Thus an increase of the amount of modifier employed will decrease the Mooney Viscosity of the product while an increase in the degree of conversion will tend to increase the Mooney Viscosity.

It is preferred that the modifier employed in the production of the first and second benzene-soluble chloroprene polymers should be a xanthogen modifier defined as having a formula that can be represented as follows:

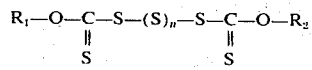

Wherein $R_1$ and $R_2$ are alkyl groups containing from 1 to 8 carbon atoms and $n$ is an integer or 0. When $n$ is 0 the compounds represented are dialkyl xanthogen disulphides which are preferred materials. Particularly preferred xanthogen disulphides are the di-ethyl and di-isopropyl compounds.

When $n$ is an integer it is preferably 1, 2, or 3. Examples of such compounds are the diethyl and diisopropyl polysulphides.

Preferred first benzene-soluble chloroprene polymers are suitably prepared by homopolymerising chloroprene in aqueous emulsion in the presence of from 0.1 to 1.0% by weight of diethyl or di-isopropyl xanthogen disulphide to a conversion of from 50 to 90%.

The fluid benzene-soluble chloroprene polymer is essentially similar to the first polymer and is therefore made in a similar way except for the requirement that its molecular weight is kept low by ensuring that sufficient xanthogen modifier is present during the polymerisation of the chloroprene. The preferred xanthogen modifier is diethyl xanthogen disulphide which has to be present in an amount of at least about 2% by weight on the weight of monomeric material in order to ensure that a suitable fluid product is obtained. One should not employ more than 7% by weight of the diethyl xanthogen disulphide and preferably from 4 to 6% by weight is used to obtain preferred fluid polymers. For convenience one can define a fluid polymer as one that has a Mooney Viscosity ML 1+4' (100°C) below 25. It is found that the amounts of other xanthogen modifiers required to effect the same reduction in molecular weight as a quantity of diethyl xanthogen disulphide is approximately calculable on a stoichiometric basis.

The quantity of fluid benzene-soluble polymer in the blend is preferably in the range 6 to 13% by weight of the blend in particular 9 to 11% by weight of the blend.

The benzene-soluble chloroprene polymers may be prepared using any convenient emulsifying agents such as, for example the alkali metal salts of fatty acids, rosin acids and disproportionated or hydrogenated rosin acids, higher alkyl sulphates or aryl sulphonic acids.

The conventional free radical type of polymerisation initiator can be used in the polymerisation system. Some examples of such initiators are hydrogen peroxide, ammonium persulphate and other water soluble salts of persulphuric acids such as potassium persulphate. An example of a water-insoluble initiator that can be used is cumene hydroperoxide. The initiator, when water-soluble, is usually added to the polymerisation system as an aqueous solution at such a rate that the desired rate of polymerisation is maintained. The rate of polymerisation can be determined by measuring the specific gravity of the emulsion during the polymerisation.

The polymerisation system may be slightly acidic, neutral or alkaline. This is influenced by the resistance of the co-monomers to hydrolysis and the alkali dependence of the emulsifier. The polymerisation is carried out by known techniques in which oxygen is excluded from the atmosphere in the polymerisation vessel. This is conveniently done by sweeping the vessel with a stream of an inert gas such as nitrogen and maintaining an atmosphere of nitrogen above the polymerisation charge.

All monomers may be present at start or some or all can be fed to the reactor during polymerisation.

The temperature range is suitably 0° to 60°C. and preferably 35° to 50°C.

The chloroprene polymer blend may be prepared by mixing aqueous latices of the two component chloroprene polymers in the appropriate proportions and then isolating the blend by any convenient method such as freeze coagulation or drum drying.

According to a modification of the present invention, the fluid benzene-soluble chloroprene polymer may be formed in situ in an emulsion of the first benzene-soluble chloroprene polymer. This is achieved by polymerising chloroprene in an aqueous emulsion to give a latex of a first benzene-soluble chloroprene polymer having a Mooney Viscosity ML 1+4 (100°C) in the range 40 to 100, adding a xanthogen modifier to the latex in an amount equivalent to 2 to 7% by weight of the weight of monomer remaining in or to be added to the latex and then polymerising this monomer to yield a quantity of fluid rubber equal to 5 to 15% by weight of the first benzene-soluble chloroprene polymer. If desired the xanthogen modifier may be added intermittantly or continuously during the formation of the fluid rubber.

Although the quantity of fluid rubber employed is relatively small it has a significant effect upon the Mooney viscosity of the blend. In practice commercial chloroprene polymers should have a Mooney viscosity greater than 35 and the preferred materials have a viscosity between 40 and 45. Thus, it is preferred to arrange that the viscosities of the two components of the blend are such that when mixed together the final product has a Mooney viscosity greater than 35 and preferably between 40 and 45.

The blends of this invention are compounded in the same manner as conventional polychloroprenes. For example, the compounds can contain clay or carbon black. Waxes, oil and other softeners and lubricants may be used but large amounts are not necessary. The use of oils and softeners in the blend lowers the bulk viscosity and may improve the smoothness of the extrudates and of the blend but has a tendency to lower the tensile strength of the vulcanisate and cause its collapse. It is a feature of this invention that such oils and softeners are not essential to obtain easy-processing properties so that vulcanisates can be obtained which have relatively high tensile strength and resistance to collapse.

The following examples illustrate blends of chloroprene polymers according to the present invention and their easy processing properties:

EXAMPLE 1

A series of polychloroprene latices was prepared in a stirred reactor at 40°C by the continuous addition of an ammonium persulphate solution to a chloroprene emulsion in water containing sodium dithionite as the initial catalyst. The polymerisations were stopped after 70% conversion of monomer to polymer by the addition of conventional short-stop ingredients. Details of the polymerisations are given below, the parts being by weight:

| Polymerisation Charge | | |
|---|---|---|
| Chloroprene | 100 | parts |
| Dresinate 214 (a rosin acid emulsifying agent) | 4.0 | " |
| Daxad 15 (a naphthalene sulphonic acid formaldehyde condensation product) | 0.7 | " |
| Sodium hydroxide | 0.1 | " |
| Water | 130 | " |
| Di-ethyl xanthogen disulohide | 2.00 | — 6.00 parts for fluid polymers |
| | 0.300 | — 0.525 parts for sol. polymers |
| Initial catalyst | | |
| Sodium dithionite | 0.0346 | " |
| Water | 0.910 | " |
| Pumped catalyst | | |
| Ammonium persulphate | 0.00238 | per hour |
| Water | 0.820 | " " |
| Short-stop Ingredients | | |
| p-Tertiary butyl catechol | 0.00815 | parts |
| Phenothiazine | 0.00815 | " |
| Toluene | 0.65 | " |
| Daxad 15 | 0.00815 | " |
| Sodium dodecyl benzene sulphonate | 0.0163 | parts |
| Water | 0.65 | " |

The resultant latices were blended as indicated below and the blended product isolated in the usual manner on a freeze roll after acidification of the latices by the addition of 10% acetic acid. The blends were evaluated by compounding as follows:

| | |
|---|---|
| Polychloroprene blend | 100 parts |
| Octylated diphenylamine | 2 parts |
| Light calcined magnesia | 4 parts |
| Stearic acid | 0.5 parts |
| G.P.F. Carbon Black | 29 parts |
| Zinc oxide | 5 parts |
| Ethylene thiourea | 0.5 parts |

Tensile properties were determined on vulcanisates obtained by curing at 153°C for 40 minutes.

Die-swells were obtained by extrusion of the mix through a triangular die at 80°C.

The results obtained are given in the following table, the sol polychloroprene being identified by its Mooney viscosity and the fluid polychloroprene by the amount of diethyl xanthogen disulphide (Dexie) used in its preparation.

component present. The contours are numbered 2 to 11 and represent the following percentage die-swells:

| | | | |
|---|---|---|---|
| 2 | 84.3% | 7 | 111.6% |
| 3 | 89.7% | 8 | 117.1% |
| 4 | 95.2% | 9 | 122.6% |
| 5 | 100.7% | 10 | 128.0% |
| 6 | 106.2% | 11 | 133.5% |

EXAMPLE 2

The procedure of Example 1 was repeated to provide two further sol polychloroprenes which differed in the conversion of monomer to polymer when the short stop agent was added. The two polymers were prepared in the presence of different amounts of di-ethyl xanthogen disulphide (Dexie) employed, the amounts used being chosen so that the two products had approximately equal Mooney viscosity (ML1+4 = 59). Blends were prepared from these products by blending both of them

| Sol Mooney | Dexie loading in fluid (p h m) | Proportion of fluid in blend (%) | Proportion of sol in blend (%) | Blend Mooney | Die Swell (%) | Tensile Strength MN/m |
|---|---|---|---|---|---|---|
| 40 | 4.0 | 10 | 90 | 31 | 94 | 21.3 |
| 48 | 2.8 | 7 | 93 | 39 | 123 | 22.0 |
| 48 | 2.8 | 13 | 87 | 32 | 98 | 22.7 |
| 48 | 5.2 | 7 | 93 | 38 | 88 | 22.4 |
| 48 | 5.2 | 13 | 87 | 31 | 84 | 22.9 |
| 60 | 2.0 | 10 | 90 | 47 | 114 | 23.8 |
| 60 | 4.0 | 5 | 95 | 51 | 123 | 23.4 |
| 60 | 4.0 | 10 | 90 | 47 | 89 | 22.6 |
| 60 | 4.0 | 10 | 90 | 49 | 99 | 22.9 |
| 60 | 4.0 | 10 | 90 | 44 | 120 | 22.2 |
| 60 | 4.0 | 10 | 90 | 44 | 102 | 21.5 |
| 60 | 4.0 | 10 | 90 | 49 | 105 | 22.2 |
| 60 | 4.0 | 15 | 85 | 43 | 123 | 21.5 |
| 60 | 6.0 | 10 | 90 | 43 | 79 | 21.1 |
| 72 | 2.8 | 7 | 93 | 61 | 134 | 24.0 |
| 72 | 2.8 | 13 | 87 | 46 | 114 | 21.5 |
| 72 | 5.2 | 7 | 93 | 55 | 95 | 21.4 |
| 72 | 5.2 | 13 | 87 | 45 | 95 | 23.4 |
| 80 | 4.0 | 10 | 90 | 58 | 123 | 23.2 |

The results obtained for the physical properties were subjected to a mathematical regression analysis.

However, as the molecular weight of the fluid decreased due to increased modifier loading, the die-swell also decreased. There was an optimum level of fluid component at about 10% which gave minimum die-swell.

This is illustrated in the accompanying drawing which shows the relationship between the die-swell of the polychloroprene compositions and the Dexie content of the fluid component and the proportion of fluid (in latex form) with 10% by weight of a fluid polychloroprene (in latex form) made according to the procedure of Example 1 using 6 parts per 100 parts monomer (p h m) of Dexie, and polymerising to 70% conversion.

The blends were evaluated and compared with a commercially available mercaptan modified polychloroprene with the results shown below:

Sol A had a 72% conversion and used 0.3985 p.h.m. of Dexie

Sol B had a 61% conversion and used 0.3710 p.h.m. of Dexie

TABLE 2

| Polymer | Extrusion Characteristics | | | Physical Characteristics | | |
|---|---|---|---|---|---|---|
| | appearance | Output (ml/min) | Die-swell % | Tensile Strength (MN/m²) | Modulus (MN/m²) | Elongation at break (%) |
| Sol A | smooth | 17.1 | 69.9 | (a)23.8 (b)16.2 | (a)7.3 (b)4.2 | (a)440 (b)880 |
| Sol B | " | 17.8 | 58.2 | (a)23.2 (b)19.4 | (a)6.3 (b)4.1 | (a)480 (b)920 |
| Commercial polymer | feathered edge | 17.6 | 84.0 | (a)22.3 (b)16.4 | (a)8.8 (b)5.1 | (a)380 (b)870 |

The physical characteristic results (a) were determined on carbon black filled vulcanised compositions as described in Example 1.

Results (b) were on gum vulcanisates prepared as set out below. Note the Modulus figures (a) were determined at 250% and figures (b) at 600% elongation.

The gum mix properties were obtained by compounding the following recipe on a two-roll mill at 50°C:

| | |
|---|---|
| Polychloroprene blend | 100 parts by weight |
| Octylated diphenbylamine | 1 parts by weight |
| Light Calcined Magnesia | 4 parts by weight |
| Zinc Oxide | 5 parts by weight |
| Ethylene thiourea | 0.35 parts by weight |

Tensile properties were determined on vulcanisates obtained by curing at 153°C for 20 minutes.

EXAMPLE A

A commercially available mercaptan modified polychloroprene was incorporated in the same composition as in Example 2. The results are shown in Table 2.

We claim:

1. A chloroprene polymer blend which comprises from 95 to 85% by weight of a first benzene-soluble chloroprene polymer having a Mooney Viscosity ML1+4' at 100°C in the range 40 to 100 and 5 to 15% by weight of a second, fluid, benzene-soluble chloroprene polymer formed by the polymerization of chloroprene in the presence of a quantity of xanthogen modifier having the formula

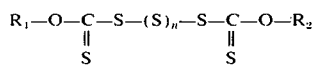

wherein $R_1$ and $R_2$ are alkyl groups containing from 1 to 8 carbon atoms and $n$ is an integer or zero sufficient to produce a fluid polymer.

2. A chloroprene polymer blend according to claim 1 wherein the first benzene-soluble polymer has a Mooney Viscosity ML1+4 in the range 50 to 70.

3. A chloroprene polymer blend according to claim 1 wherein the xanthogen modifier is a dialkyl xanthogen disulphide.

4. A chloroprene polymer blend according to claim 3 wherein the xanthogen modifier is diethyl xanthogen disulphide.

5. A chloroprene polymer blend according to claim 4 wherein the first benzene-soluble polymer is prepared by homopolymerising chloroprene in aqueous emulsion in the presence of from 0.1 to 1.0% by weight of diethyl or di-isopropyl xanthogen disulphide in a conversion of from 50 to 90%.

6. A chloroprene polymer blend according to claim 1 wherein the second, fluid, benzene-soluble chloroprene polymer is made in the presence of an amount of xanthogen modifier equivalent to 4 to 6% by weight of diethyl xanthogen.

7. A chloroprene polymer blend according to claim 1 wherein the quantity of the second, fluid, chloroprene polymer in the blend is in the range 6 to 13% by weight of the blend.

8. A chloroprene polymer blend according to claim 7 wherein the quantity of the second, fluid, chloroprene polymer in the blend is in the range 9 to 11% by weight of the blend.

9. A chloroprene polymer blend according to claim 1 wherein the blend is produced by polymerising chloroprene in aqueous emulsion to give a first benzene-soluble polymer having a Mooney Viscosity ML1+4 (100°C) in the range 40 to 100, adding a xanthogen modifier to the latex in an amount equivalent to 2 to 7% by weight of the weight monomer remaining in or to be added to the latex and then polymerising this monomer to yield a quantity of fluid rubber equal to 5 to 15% by weight of the first benzene-soluble chloroprene polymer.

10. An extruded article made from a polymer blend according to claim 1.

11. A chloroprene polymer blend as defined in claim 1 wherein said quantity of xanthogen modifier is equivalent to 2 to 7% by weight, based on weight of monomer, of diethyl xanthogen disulphide.

12. A chloroprene polymer blend as defined in claim 1 wherein n is zero.

* * * * *